W. H. ROUNDS.
DEVICE FOR APPLYING ANTISKID CHAINS.
APPLICATION FILED JULY 14, 1920.

1,372,195.

Patented Mar. 22, 1921.

Inventor:
William H. Rounds,
By his Attorneys

UNITED STATES PATENT OFFICE.

WILLIAM H. ROUNDS, OF SIOUX FALLS, SOUTH DAKOTA.

DEVICE FOR APPLYING ANTISKID-CHAINS.

1,372,195.

Specification of Letters Patent.  Patented Mar. 22, 1921.

Application filed July 14, 1920. Serial No. 396,120.

*To all whom it may concern:*

Be it known that I, WILLIAM H. ROUNDS, a citizen of the United States, and resident of Sioux Falls, in the county of Minnehaha and State of South Dakota, have invented certain new and useful Improvements in Devices for Applying Antiskid-Chains, of which the following is a specification.

My invention relates to devices for facilitating the application of non-skid chains to vehicle tires and its principal object is to provide an efficient and compact device, the use of which will make the application of these chains a simple task instead of, as is at present the case, a most unpleasant one.

The non-skid chains, generally known as "tire chains" comprise two parallel chains connected at suitable intervals by transverse or cross chains. The parallel chains are placed circumferentially of the tire, one on either side thereof, the transverse chains engaging the tread. The free ends of the circumferential chains are detachably connected by any suitable means and thus the whole device is held in place. It is obvious that, with the tire on the ground carrying the weight of the vehicle, it is impossible to make the ends of the chains meet for the connection to be made. Therefore, it is either necessary to jack the wheel up off the ground, or, when conditions will permit, to spread the chain along the floor or ground, drive or push the car until the wheel lies over it and make the connection at or near the top. Either method is troublesome and on a muddy road would be most unpleasant.

My invention is designed to overcome all these difficulties by the provision of a temporary connection which is applied to the chains at points in front and rear of that portion of the tire which is resting on the ground or embedded, whereby the chains are held in proper position until the vehicle is moved forward a sufficient distance to allow the regular connection to be made at the ends.

The preferred embodiment of my invention is described in the following specification and illustrated in the accompanying drawing, in which.

Figure 1:
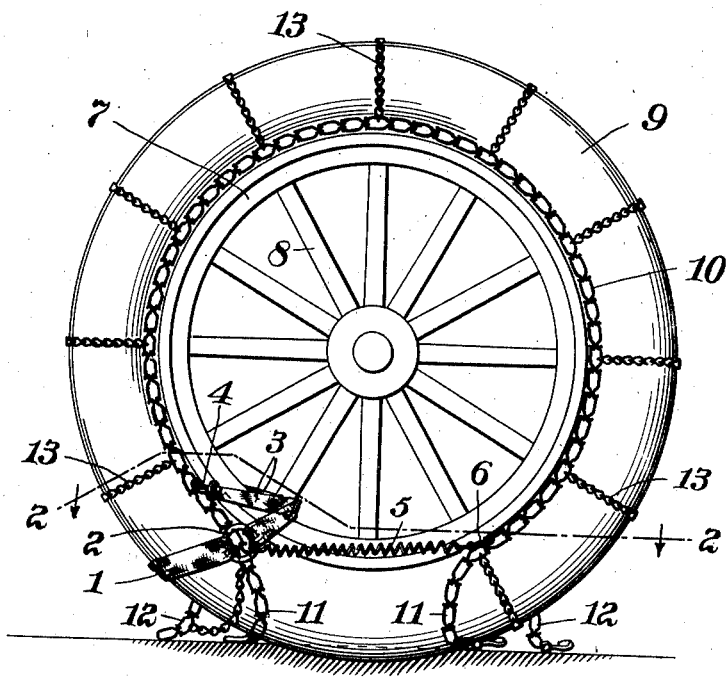
Figure 1 is a side elevation of a vehicle wheel showing the use of my device.
Figure 2:
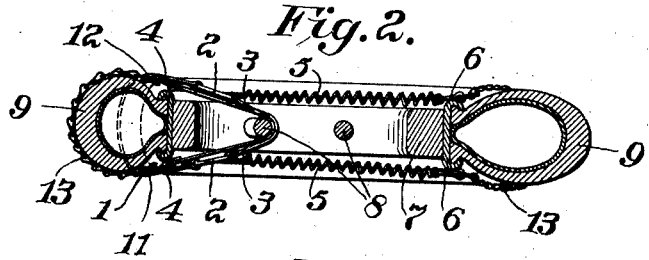
Fig. 2 is a section on the line 2—2 of Fig. 1.
Figure 3:
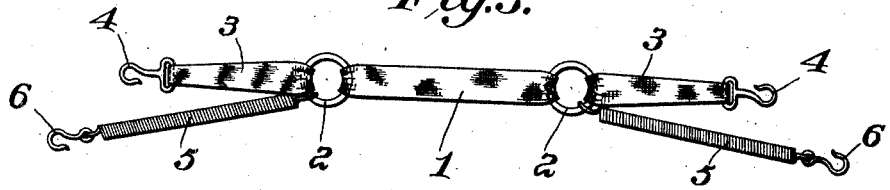
Fig. 3 is a detail of my invention.

Referring to Fig. 3 of the drawing, my device comprises a central member 1 of flexible material such as heavy canvas fabric having at either end a metal ring 2, to which are attached end members 3 of similar material, their free ends carrying metal hooks 4. To each of the rings 2 is secured one end of a coil spring 5, the free ends of which terminate in hooks 6. The importance of each of these details will become more apparent as I describe the use of the device as illustrated in Figs. 1 and 2.

The numeral 7 designates the vehicle wheel as a whole, having spokes 8 and a tire 9. The non-skid chain 10 comprises circumferential members 11 and 12 and transverse members 13.

The operation of my device is as follows:

The chain 10 is placed over the tire 9, the transverse link 13 lying across the tread. My device is placed over the chain at a point as near as possible to the ground, the band 1 engaging the tire and chain, and is secured by bringing the bands 3 through on opposite sides and engaging the hooks 4 in a convenient part of the chain 10. The springs 6 are then extended and their hooks engaged with the chain members 11 and 12 respectively at a point adjacent the opposite ends thereof. Thus the chain is securely held against movement in any direction and the vehicle may be moved to a convenient position for the regular connection to be made. My device is then readily removed and stored in some convenient place.

It will thus be seen that even though the wheel be partially embedded in mud, the chains may be quickly and easily attached by the use of my invention without so much as soiling the hands.

It will be apparent that the binding on of the front end of the chain by the use of my attachment holds the chain taut so that the dragging action of mud cannot pull it off. The chain is held solid to the casing in the revolution of the wheel so that the casing or tire cannot slip on the chain, and it enables the chain to be pulled tight on the casing so that there will be no slack.

What I claim is:

1. A device of the character described comprising a flexible portion adapted to embrace a tire chain and a tire adjacent to one end of said chain, and resilient members secured to said flexible portion adapted to engage said chain adjacent its other end whereby said chain is held against movement in either direction, substantially as described.

2. A device of the character described, comprising a central portion of flexible material, end portions of similar material having hooks at their outer ends and having their inner ends connected to said central portion by metal rings, and coiled springs carried by said rings, the free ends of said springs terminating in hooks, substantially as described.

3. A device of the character described, comprising a flexible tread encircling member terminating at its ends in rings, flexible members secured to said rings terminating in chain engaging means, and resilient members carried by said rings and having chain engaging means at their free ends, substantially as described.

In testimony whereof, I affix my signature.

WILLIAM H. ROUNDS.